Figure 1:
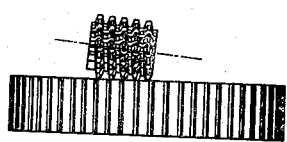

W. F. ZIMMERMANN.
PROCESS OF CUTTING GEARS.
APPLICATION FILED MAY 25, 1907.

915,923.

Patented Mar. 23, 1909.

WITNESSES:
Edwards Black
C. A. Alliston

INVENTOR
William F. Zimmermann
BY
Fischer & Sanders
ATTORNEY

UNITED STATES PATENT OFFICE.

WILLIAM F. ZIMMERMANN, OF NEWARK, NEW JERSEY.

PROCESS OF CUTTING GEARS.

No. 915,923.  Specification of Letters Patent.  Patented March 23, 1909.

Original application filed February 18, 1907, Serial No. 357,844. Divided and this application filed May 25, 1907. Serial No. 375,601.

*To all whom it may concern:*

Be it known that I, WILLIAM F. ZIMMERMANN, a citizen of the United States, and a resident of the city of Newark, in the county of Essex and State of New Jersey, have invented certain new and useful Improvements in the Process of Cutting Gears; and I do hereby declare the following to be a full, clear, and exact description of my invention, such as will enable others skilled in the art to which it pertains to exercise and perform said process.

The present accepted theoretically correct method of cutting the teeth of spiral and spur gears, results in producing gears which are not noiseless. The cause of the humming noise observed in high speed intermeshing gears, may be explained in the following manner. When the teeth of wheels are constructed in accordance with the accepted theoretically correct method, so as to produce absolutely continuous motion, it is found that when such gears are rotated in mesh at a high speed, a humming noise is produced, because of the fact that when the point of contact between two intermeshing teeth is substantially in the line of centers, the adjacent teeth are out of contact. As the two contacting teeth advance, there is a sensible space of time when there is a single pair of teeth in contact and another sensible space of time when two pairs are in contact. When the first pair recedes, and the second pair approaches, it leaves the second pair in contact, thus throwing the entire load upon that pair, until the next pair approaches in contact, when the strains are again divided between the two pairs. These sudden changes of strains from full load to half load, cause a series of shocks which at high speed, produce the humming noise heretofore referred to. I have discovered that by deviating slightly from the theoretically correct tooth, I am able to completely overcome this humming noise and produce silent running gears. In order to do this, I so shape the teeth that the load of the receding pair of teeth is gradually diminished and simultaneously, the pressure upon the approaching pair is gradually increased, so that there is no sudden transition from full load to half load, and from half load to full load, between any successive pairs of teeth, and by doing this, I find that these series of shocks are completely eliminated. The deviation from the theoretically correct tooth to which I have referred, may be in any one or more of several directions, as for example, I may relieve the points of the teeth to a sufficient degree to permit continuous contact between any pair of intermeshing teeth and an approaching pair, such relieving being to a degree sufficient to permit a gradual reduction of pressure upon the receding pair of teeth, and a gradual increase of pressure upon the approaching teeth, such degree of pressure ranging from maximum or full load, to minimum, or but an infinitesimal fraction of a load, the reduction of load upon one pair taking place simultaneously with the increase of load upon the approaching pair. The same result may be obtained by slightly undercutting the bases of the teeth to a degree somewhat in excess of that dictated by the present accepted theory, while the points of the teeth may remain the same as prescribed by theory. The same result may be obtained by both relieving the points of the teeth and undercutting the bases. In the latter case, however, the degree of relieving and undercutting amounts to a fair average of the two former methods; that is, the points are relieved to a degree a trifle less and the undercutting to a degree a trifle less than where the relieving alone or the undercutting alone would be adopted.

In the descriptive matter following, it will be noted that I have described the process in connection with hob cutters. It is obvious, however, that the process may be as readily carried out with the use of a reciprocating cutter in which the cutter itself is given not only its reciprocating motion, in a plane substantially parallel to the tangent of the helix of the cutter, and at the same time, giving said cutter a lateral motion equal to the travel of the helix during its complete rotation.

In describing my process, I will refer to the accompanying drawings, in which—

Figure 2:
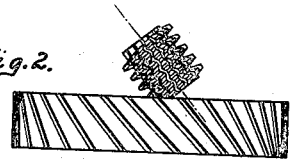
Figure 3:
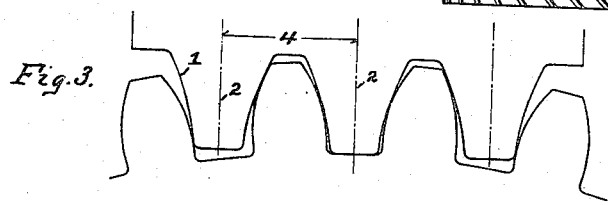
Figure 4:
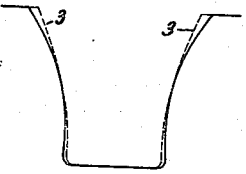
Figure 5:
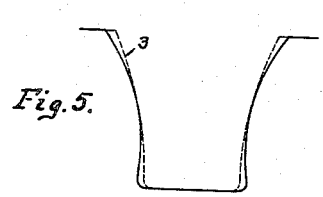
Figure 6:
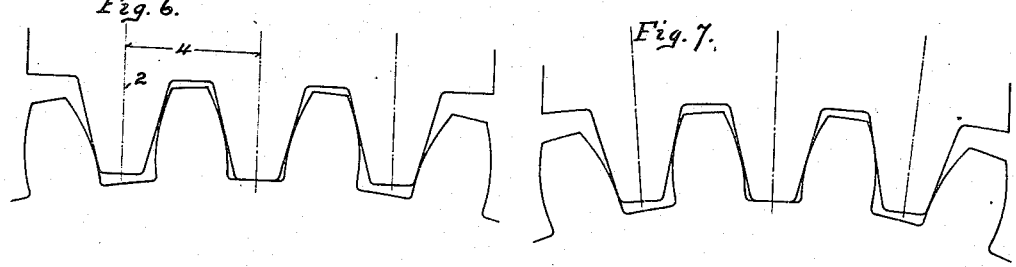
Figure 7:
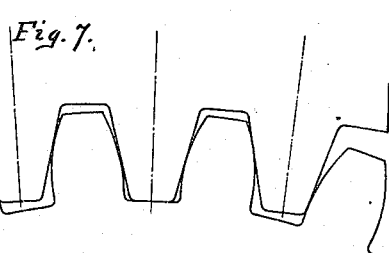
Figure 8:
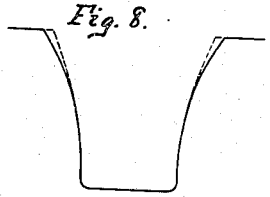
Figure 9:
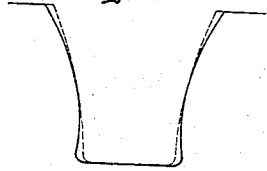

Figure 1 is a side view of a spur gear with an improved form of hob cutter shown in position for beginning the cutting of the teeth. Fig. 2 is a similar view of a spiral gear. Fig. 3 is a sectional view illustrating the improved cutter in connection with the teeth of a gear wheel in the act of carrying out my process. Fig. 4 illustrates the form of two consecutive teeth completed by my process, with the theoretically correct shape of such teeth shown in dotted lines. Fig. 5 is a view similar to Fig. 4, showing a greater degree of undercutting. Fig. 6 illustrates the method of carrying out my process, with a so-called rack tooth hob of shortened pitch. Fig. 7 illustrates another method of carrying out the process with the so-called hour glass hob. Fig. 8 illustrates the sides of a pair of consecutive teeth with the points only relieved. Fig. 9 illustrates a pair of consecutive teeth with the points relieved and the bases undercut.

In Fig. 1, I have shown an improved hob cutter, such as that illustrated in my application for Letters Patent, filed February 18, 1907, Serial Number 357,844, particularly in Figs. 2 and 3, of which said application, this is a division. In this particular case, the slots in the face of the hob forming the cutting teeth are arranged parallel to the axis of said hob in which case, it is only necessary in cutting spur gears, to set such hob at an angle with the horizontal, or at an angle with the plane of the gear to be cut, equal to the angle of the helix. In this particular style of hob, it will be noted that the sides 1 are not straight as has hitherto been the custom of forming such teeth, but they are curved to a degree differing slightly from a reverse involute. The curves of the face of the teeth, however, are symmetrical with respect to the axis of the tooth, such axis being illustrated by the dotted lines 2. In the successive positions of the finished tooth with respect to the hob, it will be noted that the points of the teeth are relieved to a degree commensurate with the departure of the face of the tooth of the hob from the line which would be dictated by the accepted correct theory. It will also be noted that the curvature of the face of the tooth near the point results in slightly undercutting the base of the tooth, as comparatively illustrated in Figs. 4 and 5, in each of which cases, the dotted lines 3 illustrate the face of theoretically cut involute teeth, while the full lines illustrate the deviation, resulting from cutting teeth by my improved process.

As above set forth in the brief description, Fig. 3 is a sectional view illustrating the improved cutter in connection with the teeth of a gear wheel in the act of carrying out my process. This figure may serve to illustrate two ways of carrying out the process; for example, it may represent the cross-section of a hob with shortened pitch and curved teeth, or it may represent a hob with normal pitch and lengthened teeth, said teeth having curved faces. When the pitch of the hob is shortened, and the points of the teeth correspondingly lengthened, it is unnecessary to set the hob to make more than the normal depth of cut in the blank and the resulting teeth will be found to be undercut substantially as illustrated in Fig. 5. With the hob of less pitch, this undercutting and relieving of points is fully taken care of in the process. When I speak of increasing the length of the teeth of the hob, I mean that the total diameter of the hob over the points of the teeth is increased over what the theoretically correct diameter of a hob for similar work should be. The degree of the undercutting of the base of the tooth will depend upon the sharpness of the curvature of the face of the cutter near its point, or what amounts to the same thing, the width of the face of the tooth of the cutter, and the degree to which the point of the tooth will be relieved, will depend upon the thickness of the base of the cutter tooth, which in all cases, should be only sufficient to produce the desired result.

As above stated, the result may be obtained by the use of a hob cutter with teeth having straight sides as illustrated in Fig. 6. In this case, however, the pitch 4 of the cutter is shorter than the normal pitch of the theoretically correct cutter, the degree of such shortening depending upon the amount or extent to which it is desired to relieve the points of the teeth. In this case, the sides of the teeth of the cutter are symmetrical with respect to the axis of the teeth; while the diameter of the hob is increased over the normal, resulting in the lengthening of the teeth of such hob as above described, but with this structure, no undercutting is made.

In Fig. 7, I have shown how my process may be carried out by the use of the hour-glass type of hob cutter. In this case, the axes of the teeth are radially arranged and are of such a thickness at their bases, as to produce the necessary relieving of the points of the teeth in the gear to be cut. The curve of the face of this cutter is a mean-curve produced normally to the curved teeth of the two types of cutters described in connection with Fig. 3; and the cutter illustrated in Fig. 6 represents the chord of this arc or curve.

The principles involved in the use of the several forms of cutters described, are analogous in that they are different ways of producing substantially the same result, that is, the production of noiseless gears, by either relieving the points of the teeth, or undercutting the bases thereof, or both relieving the points and undercutting the bases. These same results are obtained in the cutting of spiral gears as illustrated in Fig. 2, where the cutter is shown in the act of beginning the cut of a spiral gear wheel, the axis of the cutter being inclined to the horizontal, to a degree equal to the angle of the helix of the teeth in the spiral, plus the angle of the normal to the helix of the hob to its axis.

As previously set forth, I am able to produce the same results and carry out the same process by the use of a reciprocating cutter, in which case, the reciprocating cutter travels in a path substantially parallel to the teeth of the gear to be cut, and at the same time, is given a lateral feeding motion during the reciprocation of the tool, the limits of such lateral motion being substantially the same as the limit of travel of the helix from one end of the same to the other, in which case, Figs. 3, 6 and 7 might be used to illustrate the successive positions of the cutter in its lateral movement, to give the requisite undercutting and relieving of the bases and points of the teeth respectively.

I claim:

1. A process for shaping gear teeth, which consists in operating a rack tooth shaped tool successively upon each of the teeth in the gear blank being cut, rotating said blank and simultaneously advancing said tool with said rotation in a path substantially at right-angles to said teeth, said path being slightly shorter at each successive tooth than the pitch of said teeth to slightly alter the contour of said teeth from the theoretically correct contour, thereby completing the gear when the tool has made one passage at right angles to the teeth.

2. A process for shaping gear teeth, which consists in operating a rack tooth shaped tool on each of the teeth in the gear blank being cut, rotating said blank and advancing said tool simultaneously with said rotation in a path substantially at right-angles to said teeth, said path being slightly shorter than the pitch of said teeth to complete a tooth of the gear by having the tool cut successively upon each of the teeth in the gear.

3. A process for shaping gear teeth which consists of operating a helical or hob cutter, having rack shaped helices, the pitch of said helices being slightly shorter than the gear being cut successively upon each of the teeth, rotating the gear blank and simultaneously advancing the said helices in a path substantially at right angles with said teeth, said path being slightly shorter than the pitch of said teeth, all substantially as and for the purpose specified.

4. A process for shaping gear teeth which consists of operating an angularly adjustable helical or hob cutter, having rack shaped helices the pitch of said helices being slightly shorter than the gear being cut successively upon each of the teeth, feeding said helical cutter in a path substantially parallel with the face of the gear blank, rotating the gear blank and simultaneously advancing said helices in a path substantially at right angles to said teeth, said path being slightly shorter than the pitch of said teeth to slightly alter the contour of said teeth from the theoretically correct contour.

5. A process for shaping gear teeth, which consists in operating a rack tooth shaped tool on each of the teeth in the blank to be cut, said tool having a corrected cutting contour, so shaped, that the resulting path described by the cutting faces produces an alteration in the contour of the gear teeth, rotating said blank and simultaneously advancing said corrected rack tool in a path substantially at right angles with said gear teeth, said path differing from the path of a theoretically correct shaped rack tool to slightly alter the contour of said teeth from the theoretically correct contour.

6. A process for shaping gear teeth which consists of operating a helical or hob cutter, having rack tooth shaped helices successively upon each of the teeth, said helices having a corrected cutting contour, so shaped, that the resulting path described by the cutting faces produces an alteration in the contour of the gear teeth, rotating the gear blank and simultaneously advancing the said helices in a path substantially at right angles with said gear teeth, said path differing from the path of the theoretically shaped helices to slightly alter the contour of said teeth from the theoretically correct contour.

7. A process for shaping gear teeth which consists of operating an angularly adjustable helical or hob cutter, having rack shaped helices successively upon each of the teeth, said helices having a corrected cutting contour, so shaped, that the resulting path described by the cutting faces produces an alteration in the contour of the gear teeth, feeding said helical cutter in a path substantially parallel with the face of the gear blank, rotating said gear blank and simultaneously advancing said helices in a path substantially at right angles with said gear teeth, said path differing from the path of the theoretically correct shaped helices to slightly alter the contour of said teeth from the theoretically correct contour.

8. A process for shaping gear teeth which consists of operating an angularly adjustable helical or hob cutter having rack shaped helices successively upon each of the teeth, said helices corrected to point to a common center, thereby altering the contour of said teeth from the theoretically correct contour, feeding said helical cutter in a path substantially parallel with the face of the gear blank, rotating said gear blank and simultaneously advancing said helices in a path substantially at right angles with said gear teeth, said path differing from the path of the theoretically correct shaped helices to slightly alter the contour of said teeth from the theoretically correct contour.

This specification signed and witnessed this 19th day of April 1907.

WILLIAM F. ZIMMERMANN.

Witnesses:
Louis M. Sanders,
Fred'k C. Fischer.